Sept. 8, 1953 A. PITNER 2,651,552
FLAT BEARING MEANS
Filed July 18, 1950 3 Sheets-Sheet 1

INVENTOR
ALFRED PITNER

By Linton and Linton
ATTORNEYS

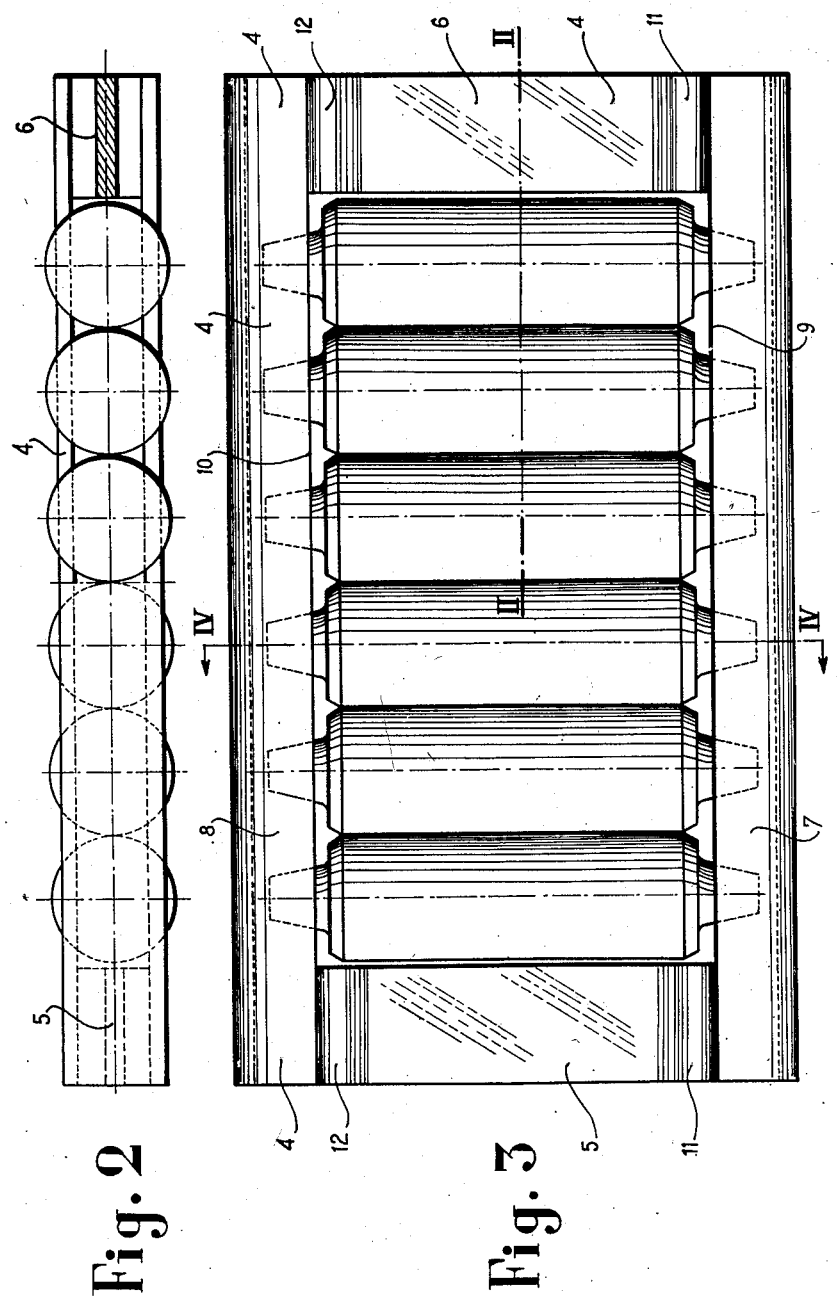

Sept. 8, 1953 A. PITNER 2,651,552
FLAT BEARING MEANS
Filed July 18, 1950 3 Sheets-Sheet 3

INVENTOR
ALFRED PITNER
By Linton and Linton
ATTORNEYS

Patented Sept. 8, 1953

2,651,552

UNITED STATES PATENT OFFICE 2,651,552

FLAT BEARING MEANS

Alfred Pitner, Paris, France, assignor to Société dite: Societe Anonyme des Roulements a Aiguilles, Rueil-Malmaison, France, a French company Application July 18, 1950, Serial No. 174,503
In France July 18, 1949

4 Claims. (Cl. 308—6)

In numerous types of machinery, two members each having a flat surface facing another and corresponding surface of the other member, have to be subjected to relative displacement under a given load with both said flat surfaces remaining in opposite facing relationship; such is the case for instance in the traversing carriages in machine-tools.

It is necessary, in order that such displacements be readily effected, that the friction to be overcome during the displacements be reduced to a minimum and the contacting parts be perfectly lubricated.

The solutions so far suggested to solve this problem are accompanied by many drawbacks and do not, in particular, prevent the surfaces in frictional contact from being subjected to marked wear within a compartively short time.

It is an object of this invention to overcome or reduce these drawbacks. The invention provides a straight or flat bearing cage containing a set of cylindrical bearing elements, i. e., rollers or needles, mounted in parallel relationship and sequentially to one another, said cage being accommodated in one of the adjacent flat faces of the parts that are to be subjected to relative displacement.

Such a flat cage with cylindrical bearing elements may be embodied in a number of different ways including by way of example, only the embodiments possessing one or more of the following features:

(1) The ends of the cylindrical bearing elements are reduced in diameter and engage in longitudinally-extending grooves formed in the frame of the cage, so as to prevent the cylindrical elements from dropping out of the cage while the latter is being handled with the elements in mounted condition therein.

(2) The flat cage consists of a sheet metal frame with two longitudinal edges each in the form of a groove for receiving the reduced-diameter ends of the bearing elements and two transverse edges located adjacent to the plane extending through the axes of the bearing elements, each of said transverse edges being connected at each end thereof by a bend with the related longitudinal edge.

Further according to this invention, the transverse edges of the frame may be initially bent and the free edge of the groove in one of the longitudinal edges is momentarily moved away from the free edge of the opposite groove; in this condition of the frame, the bearing elements are inserted endwise into the groove that has its free edge in normal condition, with their opposite ends facing the other groove, rocked to open condition; then this latter groove is brought, by a rotation about its bent portion, from its momentary condition serving to mount the bearing elements, to the condition in which it overlaps the ends of these elements, and the resulting cage is then ready for use.

According to another embodiment of the invention, the frame is initially constructed with its transverse edges bent and the free edges of both its grooves are moved apart from each other by an amount sufficient to allow insertion of the bearing elements into the frame; then the free edges of both grooves are brought towards each other so that each will overlap a free end of the bearing elements.

In a third embodiment of the invention, the frame is initially formed without any bends, the free edges of both grooves being then spaced from each other by an amount such that the bearing elements can be inserted. The elements are then dropped into the gap defined between the free edges of the grooves; then the transverse edges of the frame are bent so that the free edges of the grooves will overlap the ends of the bearing elements.

In a further modification of the invention the edge or flange of one longitudinal side of the frame which overlaps the reduced diameter ends of the bearing elements may be formed with a notch of sufficient size to enable one end of each cylindrical bearing element, i. e., roller or needle, to be inserted through it, the other end being inserted into the groove on the opposite side of the frame, said bearing element then being displaced in a direction parallel to its axis through both grooves and thus moved to a position in which the element is retained in said grooves.

The sheet-metal frame of an elongated cage for cylindrical bearing elements according to the invention can be hardened.

Preferably, in a cage according to the invention, the cylindrical bearing elements are needles.

The invention further includes within its scope any mechanical assembly comprising two parts each having a flat face movable in facing relationship to a flat face of the other part, and one at least of said parts being provided with one or more flat bearing cages according to any of the above-specified constructions.

In a mechanical assembly of this kind, the flat bearing face of either of the two oppositely-movable parts can be equipped with a plurality of flat bearing cages of the above-defined type distributed in any desired manner over said flat face; for example, several flat cages of this kind can be arranged in line, being either juxtaposed with, or spaced by any desired amounts from, one another.

Finally, the present invention includes any machine including at least one mechanical assembly of the type just specified.

In the drawings:

Fig. 2 illustrates the same cage and shows, on its left side, the cage in longitudinal elevation, while on its right side it shows a longitudinal section of the cage on line II—II of Fig. 3.

Fig. 3 is a plan view of the same cage.

Figure 1:
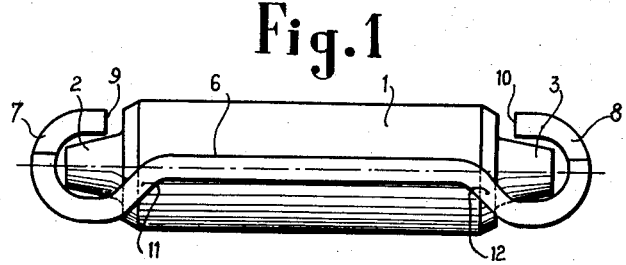
Fig. 1 is an elevational and end view, drawn to an enlarged scale, of a needle-bearing cage ready for use.
Figure 4:
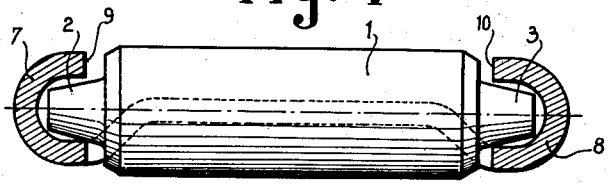
Fig. 4 is a transverse section through the cage of Figs. 1 to 3 on line IV—IV of Fig. 3.
Figure 5:
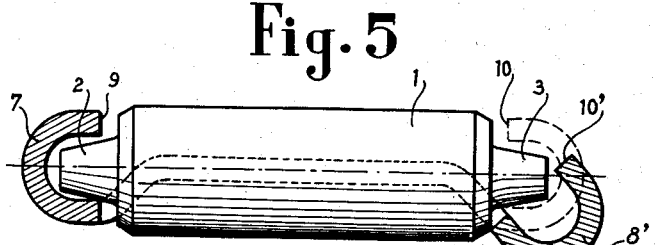
Figure 6:
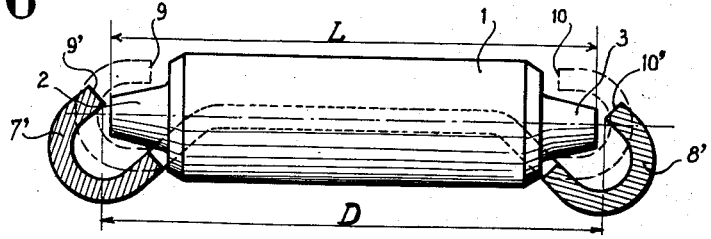
Figure 7:
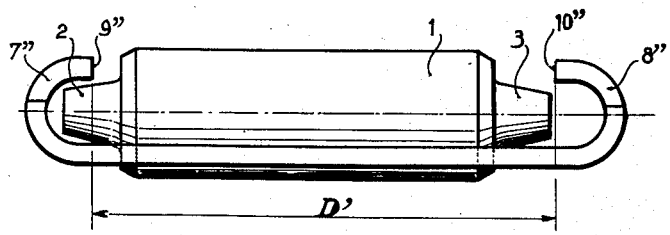

Figs. 5, 6 and 7 relate to three ways of mounting the needles in the cage frame, being sections similar to that of Fig. 4.

Figures 8, 9:
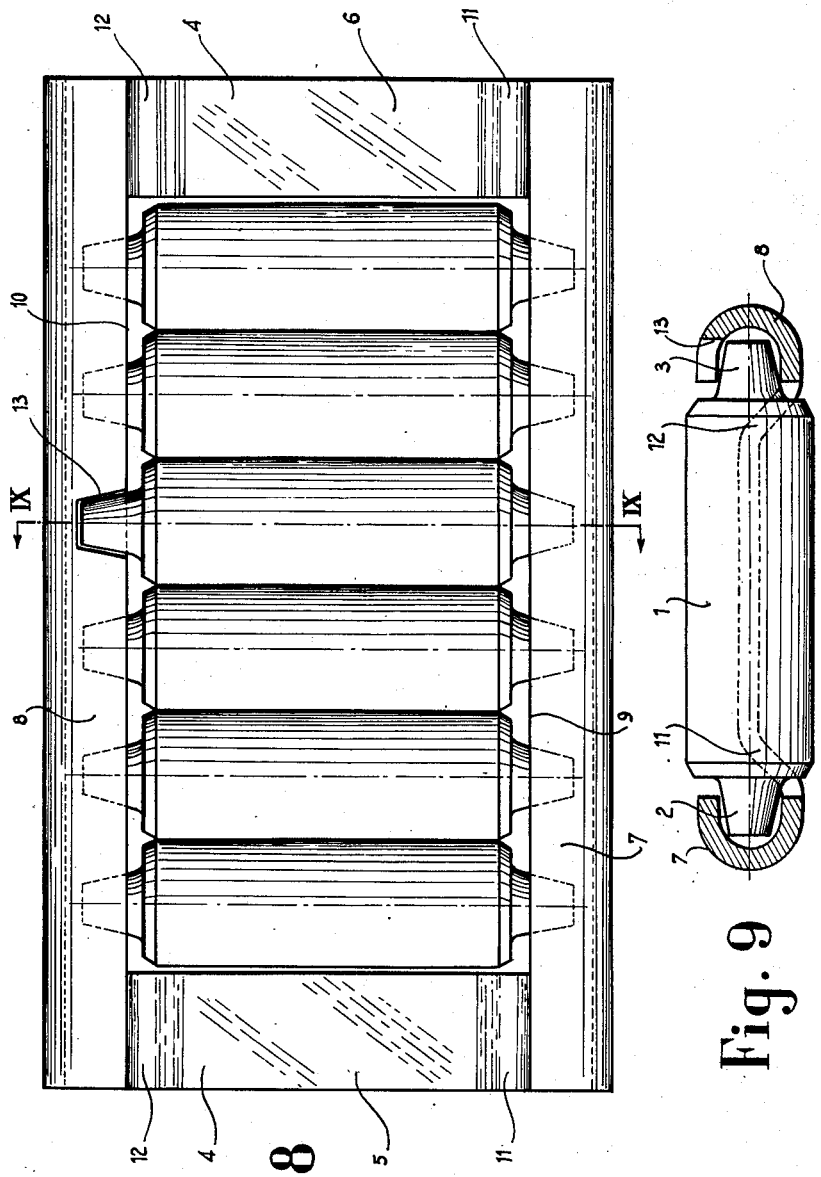

Fig. 8 is a plan view of a cage similar to the foregoing and comprising a frame formed with a notch for insertion of the needles.

Fig. 9 is a transverse cross section of this last-mentioned cage, the section being made through the needle-inserting notch on line IX—IX of Fig. 8.

In the various figures similar references have been used to designate similar elements.

1 designates the needles herein formed with reduced diameter ends 2 and 3. The cage for receiving the needles consists of an integral sheet-metal frame 4 having two transverse end-sides 5 and 6 and two longitudinal sides 7 and 8; each of the longitudinal sides is in the form of a groove or channel semicircular in cross-section serving as a housing for the corresponding reduced end of each of the needles; the upper edges or flanges 9 and 10 of these longitudinal sides overlap or overhang the reduced ends 2 and 3 of the needles.

The transverse sides 5 and 6 of the blocking frame are connected with the longitudinal sides 7 and 8 over bent or cambered portions 11 and 12; each of the transverse sides 5 and 6 is flat in its central portion located between both longitudinal sides between these cambered portions.

Fig. 5 illustrates a method of producing a cage similar to that shown in Figs. 1 to 4; in this method, one of the longitudinal sides 7, semi-circular in cross-section, of the cage, is shown as having already received the ends 2 of the needles 1 therein, while the opposite longitudinal side 8 has been rocked open by distorting the frame in order to move its upper edge 10 as at 10' away from the upper edge 9 of the opposite longitudinal side 7, thereby to allow the needles to be positioned facing the groove 8 now in the position 8'; after the needles have thus been positioned, the groove 8' is straightened up as at 8 in order that its upper edge 10 should overlap the ends 3 of the needles; the cage is then in condition for use.

In Fig. 6, the frame is initially formed with both its grooves rocked open, in the positions 7'—8', with the flanges 9'—10' spaced apart by a distance D greater than the length L of the needles. The needles 1 are laid on the frame, then the slots 7'—8' are restored to the positions 7 and 8 in which their edges 9 and 10 overhang the ends of the needles; the cage is now completed.

In Fig. 7, the frame is initially formed without bends. In this condition, the flanges 9 and 10 of the grooves, positioned at 9" and 10" are spaced apart a distance D' greater than that which will prevail after the bends are made, so that the needles can be laid into the opening in the frame, the needles being for this purpose if necessary inclined for their insertion and engaged into either one of the flanges; then, the transverse edges of the frame are bent as at 11 and 12 in Fig. 1, the frame then serving the function of a retaining means for the needles and the cage being thus completed.

In a modified embodiment of the invention (Figs. 8 and 9), one edge 9 of the frame is formed with a cut-out 13 sufficient in size to enable the needles to be inserted one by one through it into the cage.

In practice, needle-bearing cages according to the invention can be provided with needles of the smallest diameters and may thus be made to have very small dimensions.

What I claim is:

1. Flat bearing assembly which comprises a rectangular frame including side walls and end walls, a set of cylindrical bearing elements with reduced end-portions mounted in juxtaposed relation in said frame, an up- and in-turned flange along each side wall defining an inwardly-open channel, said cylindrical element end-portions rotatably seated in said channels with said flanges freely overlapping said end-portions to confine said bearing elements transversely of said frame, and said end walls confining said elements longitudinally of said frame.

2. Flat bearing assembly which comprises a rectangular frame including side walls and end walls, said side walls formed with up- and in-turned flanges defining inwardly-open channels having a longitudinal seating surface and an overlapping retaining flange, said end-walls being depressed towards each end thereof whereby to have a major intermediate portion raised with respect to said side-wall seating surfaces, and a set of cylindrical bearing elements with reduced ends seated on said seating surfaces and retained by said overlapping retaining flanges, said raised end-wall portions abutting the end ones of said cylindrical bearing elements substantially along the axial horizontal plane of said cylindrical bearing elements.

3. Flat bearing assembly as in claim 2 which further comprises at least one cut-out formed in at least one of said retaining flanges adjacent the inturned edge thereof to allow insertion of said cylindrical bearing elements into said frame.

4. Flat bearing assembly as in claim 1, wherein the cylindrical bearing elements comprise needle-bearing elements.

ALFRED PITNER.

References Cited in the file of this patent

UNITED STATES PATENTS

| Number | Name | Date |
|---|---|---|
| 311,925 | Shoemaker | Feb. 10, 1885 |
| 1,245,307 | Barber | Nov. 6, 1917 |
| 1,261,507 | Gabriel | Apr. 2, 1918 |
| 1,301,389 | Conrow | Apr. 22, 1919 |
| 1,752,616 | Ryan | Apr. 1, 1930 |
| 1,898,273 | Stevens | Feb. 21, 1933 |
| 2,520,453 | Burmist | Aug. 29, 1950 |

FOREIGN PATENTS

| Number | Country | Date |
|---|---|---|
| 266,186 | Switzerland | Jan. 15, 1950 |
| 363,533 | Germany | Nov. 10, 1922 |